July 18, 1961   J. P. BRACHT   2,992,671
PNEUMATIC TIRE BEAD CONSTRUCTION
Filed May 3, 1957
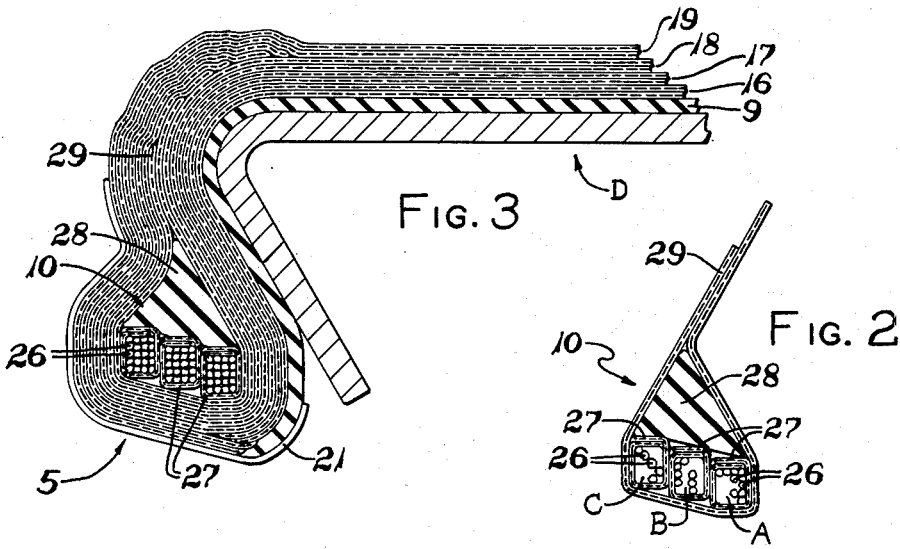
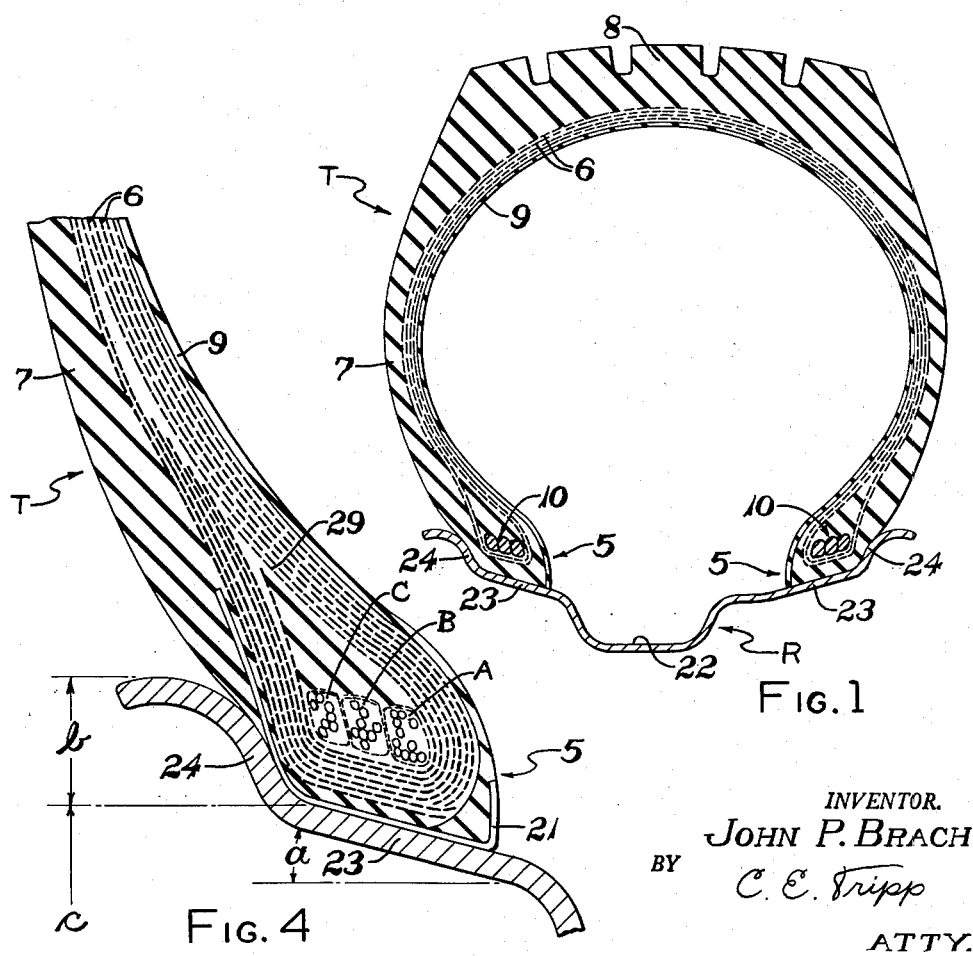
INVENTOR.
JOHN P. BRACHT
BY C. E. Tripp
ATTY.

United States Patent Office 2,992,671
Patented July 18, 1961

2,992,671
PNEUMATIC TIRE BEAD CONSTRUCTION
John P. Bracht, Akron, Ohio, assignor to The B. F. Goodrich Company, New York, N.Y., a corporation of New York
Filed May 3, 1957, Ser. No. 656,965
5 Claims. (Cl. 152—362)

This invention relates to pneumatic tire bead constructions and although it is not limited to heavy-duty pneumatic tire constructions such as truck and bus tires, the invention is of special importance in that service. Tubeless tires were initially introduced for use on passenger cars and light trucks wherein the rim is a one-piece drop center rim which readily forms part of an air chamber with the tire. Truck rims, on the other hand, were customarily made in two or more circumferentially divided parts and this construction presented the problem of an air seal if the truck tires were to be tubeless tires. The reason that the rims were circumferentially divided for truck service is that the tires are large, heavy and stiff and could not be readily mounted and dismounted from the drop center rim having the conventional proportions established by the Tire and Rim Association, Inc., 2001 First National Tower, Akron, Ohio. Accordingly, the Tire and Rim Association, Inc., has issued in its "1956 Year Book," p. 2–30 to 2–33, specifications for one-piece drop center truck and bus rims which function somewhat differently than do the previous conventional, light duty one-piece drop center rims. With the light-duty rims, reliance is placed on the side flanges for retaining the tire beads axially in place against the spreading force of inflation air in the tire and rim assembly, and the same applies to prior circumferentially divided truck and bus rims wherein the side flanges have a radial dimension of from 1 to 2 inches. The one-piece truck and bus rim distributes the function of axially retaining the beads in place on the rim against inflation pressure between the bead seats and the rim side flanges. This is accomplished by forming the bead seats of the rim with a taper that is quite pronounced as compared to the relatively small (5 degree) taper of the bead seats of the conventional drop center rim, and by forming the tire beads to substantially conform to such taper so that due to presence of the inextensible bead cores in the tire beads a severe wedging action and a corresponding strong retaining action is attained between the bead seats of the rim and the tire beads at the tapered bead seats.

With this arrangement, it has been found possible to reduce the height of the rim side flanges because they are not solely relied upon for assuming the lateral load on the beads and such reduction of height of the side rim flanges make it possible to mount and dismount large heavy-duty tires using a one-piece rim with a drop center well, thereby facilitating operation of the tires as tubeless tires, providing, of course, that the tires themselves are properly designed for such operation.

It has been found desirable to have the general envelope of the bead cores correspond substantially to the taper of the bead seats of the rim, which taper is in the order of 15° relative to the axis of the rim. It is also desirable that the bead cores be limited in their radial dimensions so that they do not extend radially past the relatively low side flanges of the rim. This means that the bead cores for such tires will be relatively wide axially as compared to their height radially and that they should have an over-all, generally conical shape to fit the bead seats of the rim.

The bead cores are formed by winding a length of high tensile strength wire or possibly narrow tape into an annular bundle whereupon the wound bundle is spirally wrapped with rubberized fabric maintaining the wires in the proper cross-sectional shape. This winding of the wires into a bundle or ring is done by automatic machinery which produces bead cores having a generally rectangular section and to wind bead cores having the desired wide conical section referred to would require special machines. Also, in the larger sizes wrapping the assembled bead cores as a group might be difficult or impossible using standard wrapping machines. According to this invention, I am able to provide a bead core having the desired shape referred to using conventional type bead winding and wrapping machines by forming individual cores or bundles of progressively increasing diameter which individual cores are preferably separately wrapped and then all are assembled with a suitable gum filler strip and a flipper strip may be applied around the wrapped cores and filler strip. This provides an assembly of cores that has a generally conical shape with the assembly being wider axially than the radial section of the assembly. With this arrangement, a desired conformance and fit of the beads to the tapered bead seats of the rim is attained without need for specially shaped fillers or inserts in the beads, and without need for special machinery to form the bead cores. Furthermore, in accordance with this invention, the tire can be built in a conventional manner in that a single bead assembly is set on the drum and the cord or carcass plies are turned up or down, as the case may be, around the bead assembly taken as a unit, and not around individual bead core portions of the final bead assembly.

Finally, a flexibility in design is provided in that bead cores of almost any conical shape and dimensions can be formed by selecting the proper number of component cores that make up the complete core, along with selecting their various internal circumferences or diameters, together with the selection of the desired cross-sectional shape of each individual ring.

The manner in which this invention may be practiced by one skilled in the art is explained in the following description of a preferred embodiment of the invention taken in conjunction with the accompanying drawings.

In the drawings:

FIG. 1 is a section of a tire embodying the invention mounted on a rim;

FIG. 2 is an enlarged partial section of a bead assembly;

FIG. 3 is a partial transverse section showing the tire carcass and bead assembly on the building drum; and FIG. 4 is an enlarged section of one bead portion of the tire mounted on a rim.

Referring to the drawings, tire T of the invention has a pair of axially spaced beads 5 to which are anchored plies of rubberized cord material 6 to form a tire carcass, there being a rubber cover bonded to the carcass comprising a carbon black reinforced rubber body 7 forming the sidewall rubber of the tire and the usual body of tread rubber 8. The tubeless tire has a relatively air impervious liner 9 bonded to the interior surface of the carcass in the manner now known in the tubeless tire art.

Referring to FIG. 2, the bead core assembly 10 is formed of three individual cores A, B and C. In the tire given as an example, which is a 9.00" x 22.5" truck tire, the individual cores are formed of five layers of wire 26 formed of .037" diameter steel wire and such wire is coated with rubber to a gage of .051". Each layer has four strands of wire. The individual cores are preferably spirally wrapped with rubberized fabric tape 27 after winding, but in certain of the smaller sizes they may be wrapped as a group. The individual cores are approximately .224 inch wide and .280 inch high in section. The internal diameter of the smallest core is 22.57 inches and that of the largest 22.87 inches with the other bead core being of intermediate diameter. This arrangement was found to give an angle of the centers of the cores with the axis of the tire of 12 to 15 degrees in the completed tire. A bead filler 28 of triangular section is placed around the outer circumference of the cores, and the assembly may be wrapped with a flipper 29, so that the cores can be applied to the carcass on the building drum as a unit.

An 8-ply heavy-duty truck tire is illustrated in the drawings, which tire may be a band built tire. The liner and the first band 16, which has two plies of rubberized core fabric, will have been assembled on the band drum and applied to the building drum D as seen in FIG. 3. The next two bands 17 and 18, each having two plies, are successively applied to the drum and the edges are folded down around the sides of the drum before the beads are set. After the beads 10 are set, the bands 17 and 18 are successively turned up around the heel of the beads and band 16 and the liner are turned up around the toe region of the beads. Next the outermost band 19, also having two plies, is placed on the drum and turned down around the other plies and the beads extending to the toe region of the beads. A finishing or chafer strip 21 is wrapped about the bead area in accordance with the usual practice. Finally, the sidewall and tread rubber components are applied to the carcass, the building drum is collapsed and the tire is shaped and cured.

Referring to FIGS. 1 and 4 showing a tire bead in section mounted on a rim R, the rim has a drop center well 22 merging with laterally extending tapered bead seats 23 from which extend the low side flanges 24. The angle (a) in FIG. 4 is the angle that the bead seats make with the axis of the rim and is specified in the Tire and Rim Association, Inc., 1956 Year Book as being 15°, plus or minus 1°. The circumference of the individual bead cores A,B and C is selected so that in the completed tire a line generally tangent to the inner peripheries of the individual cores makes substantially the same angle with the axis of the cores as the angle (a) (FIG. 4) of the bead seats makes with the axis of the rim. In other words, the inner faces of the bead cores approximate a cone having an apex angle twice that of the rim bead seats 23. This insures that a firm engagement between the beads and the tapered bead seats of the rim is provided and yet, the bead cores do not extend past the radial dimension of the side flanges 24 of the rim. To give an example, the height (b) of the side flanges of the rim for a 22½″ truck tire rim is ½″ and the diameter (c) shown on FIG. 4 will be 22½″. In the arrangement of this invention, the diameter and section of the individual bead cores will be so chosen that the maximum diameter of the largest bead core C will be in the neighborhood of 23″ so that even though the rim flange height (b) is relatively small, the bead cores do not extend into the flex zone of the tire sidewall to cause high localized stresses during service. Nevertheless, a firm engagement between the tire beads and the rim is attained so that the tire will not be forced out of place in service.

Having completed a detailed description of a preferred embodiment of my invention, I claim:

1. A pneumatic tire comprising an annular carcass formed of a plurality of plies of reinforced rubber material surmounted by a tread portion and with the said carcass terminating in axially spaced bead portions the bases of which extend at an acute angle in the order of 15° relative to the axis of the tire, the said bead portions each containing a unitary assembly of a plurality of annular members of different diameters with each of said members formed of a plurality of convolutions of wire-like metal and with the said members in side-to-side contact, and a common covering for the said members, the inner diameter of the axially outermost of said members in each bead being larger than the inner diameter of the axially innermost of the members in that bead with the radial inner surfaces of said members each extending substantially the same distance from the adjacent bead base and with all of said plies extending externally of the said common covering for said members.

2. A pneumatic tire comprising an annular carcass formed of a plurality of plies of reinforced rubber material surmounted by a tread portion and with the said carcass terminating in axially spaced bead portions the bases of which extend at an acute angle in the order of 15° relative to the axis of the tire, the said bead portions each containing a unitary assembly of a plurality of annular members of different diameters with each of said members formed of a plurality of convolutions of wire-like metal disposed in a configuration generally rectangular in cross section and with the said members in side-to-side contact, a common covering over the said members in each bead portion with the radially inner surface of said covering generally parallel to the base of the bead portion in which it is located, and with all of said carcass plies in each bead portion extending externally of the said common covering in that bead portion.

3. A pneumatic tire as defined in claim 2 wherein the said common covering of the annular members in each bead portion is a flipper strip folded around the said annular members and having the edges thereof extending radially outwardly in said carcass.

4. A pneumatic tire comprising an annular carcass formed of a plurality of plies of reinforced rubber material surmounted by a tread portion and with the said carcass terminating in axially spaced bead portions the bases of which extend at an acute angle in the range of 12° to 15° relative to the axis of the tire, the said bead portions each containing a unitary assembly of a plurality of annular members of different diameters with each of said members formed of a plurality of convolutions of wire-like metal disposed in a configuration generally rectangular in cross section, the said members being arranged in each bead portion in the order of their diameters with the member of greatest diameter axially outermost and with the members in side-to-side contact, a common flipper strip extending around all of said members in a bead portion with the edges of said flipper strip disposed adjacent each other radially outwardly of the members therein, and a unitary filler member generally triangular in cross section disposed within said flipper strip in each bead portion with the base of said filler member in each bead portion contacting the upper surface of each of said annular members in that bead portion.

5. A pneumatic tire adapted to be mounted on a unitary drop center rim including axially spaced generally conical tire bead seats with a well therebetween and low profile side flanges extending radially outwardly from said bead seats, the said tire comprising an annular carcass formed of a plurality of plies of reinforced rubber material surmounted by a tread portion with the said carcass terminating in axially spaced bead portions the bases of which are generally conical with an apex angle in the order of 30°, said bead portions each containing a unitary assembly of a plurality of annular members of different diameters in side-to-side contact with each of said members formed of a plurality of convolutions of wire-like metal disposed in a configuration generally rectangular in cross section, the said members being arranged in each bead portion in the order of their diameters with the member of greatest diameter axially outermost and with the maximum diameter of the largest of said members not exceeding the diameter of the rim-flange engaging areas of the bead portions, the inner diameters of said members being such that a tangent to the inner peripheries of the latter is generally parallel to the base of the bead in which the members are located, a common flipper strip extending around all of said members in a bead portion with the edges of said flipper strip disposed adjacent each other radially outwardly of the members therein, and a unitary filler member generally triangular in cross section disposed within said flipper strip in each bead portion with the base of said filler member contacting the upper surface of each of said annular members in that bead portion.

References Cited in the file of this patent

UNITED STATES PATENTS

| | | |
|---|---|---|
| 1,174,238 | Dowse | Mar. 7, 1916 |
| 1,548,370 | Midgley | Aug. 4, 1925 |
| 2,817,381 | Powers | Dec. 24, 1957 |

FOREIGN PATENTS

| | | |
|---|---|---|
| 159,851 | Australia | Nov. 17, 1954 |
| 514,892 | Italy | Feb. 11, 1955 |

(Corresponding British No. 768,478, Feb. 20, 1957)